(12) United States Patent
Milne et al.

(10) Patent No.: US 9,804,384 B2
(45) Date of Patent: Oct. 31, 2017

(54) LASER SCANNING SYSTEM FOR LASER RELEASE

(71) Applicant: M-SOLV LIMITED, Oxford, Oxfordshire (GB)

(72) Inventors: David Charles Milne, Chipping Norton (GB); Philip Thomas Rumsby, Woodstock (GB)

(73) Assignee: M-SOLV LIMITED, Oxford (GB)

( * ) Notice: Subject to any disclaimer, the term of this patent is extended or adjusted under 35 U.S.C. 154(b) by 103 days.

(21) Appl. No.: 15/027,527

(22) PCT Filed: May 9, 2014

(86) PCT No.: PCT/GB2014/051423
§ 371 (c)(1),
(2) Date: Apr. 6, 2016

(87) PCT Pub. No.: WO2015/052475
PCT Pub. Date: Apr. 16, 2015

(65) Prior Publication Data
US 2016/0246050 A1    Aug. 25, 2016

(30) Foreign Application Priority Data

Oct. 8, 2013 (GB) .................................. 1317773.8

(51) Int. Cl.
*G02B 26/08*    (2006.01)
*G02B 26/10*    (2006.01)
(Continued)

(52) U.S. Cl.
CPC ............ *G02B 26/101* (2013.01); *B23K 26/00* (2013.01); *B23K 26/0066* (2013.01);
(Continued)

(58) Field of Classification Search
CPC .. G02B 26/10; G02B 26/101; G02B 27/0927; G02B 5/3066; G02B 5/3075; B23K 26/00; B23K 26/0066; B23K 26/082
(Continued)

(56) References Cited

U.S. PATENT DOCUMENTS 4,694,139 A    9/1987   Roder
5,436,867 A    7/1995   Mok
(Continued)

FOREIGN PATENT DOCUMENTS

EP    2258510 A1    12/2010
EP    2428979 A1    3/2012
(Continued)

OTHER PUBLICATIONS

Office Action and Search Report regarding Taiwan Application No. 103118490, filed May 27, 2014. Translation provided by J.A.Kemp.

*Primary Examiner* — James Phan
(74) *Attorney, Agent, or Firm* — Harness, Dickey & Pierce, P.L.C.

(57) ABSTRACT

The invention relates to a laser scanning system and associated method. In a disclosed arrangement the method comprises using a laser source to produce a laser beam; using a scanning module to scan the laser beam over the surface of a substrate; and using a redirecting unit at a position in a beam path of the laser beam between the scanning module and the substrate to control the direction of incidence of the laser beam onto the substrate, wherein: the laser beam is scanned over a predetermined region on the substrate in such a way that each portion of the region is exposed by the laser beam from a plurality of different directions of incidence.

28 Claims, 3 Drawing Sheets

(51) Int. Cl.
*B23K 26/00* (2014.01)
*B23K 26/082* (2014.01)
*G02B 5/30* (2006.01)
*G02B 27/09* (2006.01)

(52) U.S. Cl.
CPC .......... *B23K 26/082* (2015.10); *G02B 5/3066* (2013.01); *G02B 27/0927* (2013.01)

(58) Field of Classification Search
USPC .................... 359/201.1–202.1, 205.1, 204.5, 359/207.7–207.9
See application file for complete search history.

(56) References Cited

U.S. PATENT DOCUMENTS

| | | |
|---|---|---|
| 2006/0001936 A1 | 1/2006 | Chen |
| 2009/0130467 A1 | 5/2009 | Liu et al. |
| 2010/0014083 A1* | 1/2010 | Ueno ................. G01N 21/9501 356/364 |
| 2010/0245959 A1 | 9/2010 | Tanahashi et al. |

FOREIGN PATENT DOCUMENTS

| | | |
|---|---|---|
| TW | 200924577 A | 6/2009 |
| TW | 201143952 A | 12/2011 |
| WO | WO-2011-069735 A1 | 6/2011 |
| WO | WO-2013-080928 A1 | 6/2013 |

* cited by examiner

LASER SCANNING SYSTEM FOR LASER RELEASE

CROSS-REFERENCE TO RELATED APPLICATIONS

This application is a 371 U.S. National Stage of International Application No. PCT/GB2014/051423, filed May 9, 2014, which claims the benefit of and priority to British Patent Application No. 1317773.8, filed Oct. 8, 2013. The disclosures of the above applications are incorporated herein by reference.

The invention relates to a method and apparatus for scanning a laser over a substrate, particularly for the purposes of performing laser release of a flexible product layer from a rigid carrier layer.

It is known to manufacture flexible electronic components, for example flexible electrophoretic or OLED displays, by mounting a flexible product layer containing the electronic components on a rigid carrier layer. A connection between the product layer and the carrier layer is maintained during processing by a laser release layer. After processing, the product layer can be released from the carrier layer by suitable irradiation of the laser release layer, normally through the carrier layer. The laser release layer may comprise a layer of polyimide, for example. The carrier layer may be formed from a glass, for example the type of display glass typically used in TFT-LCD processing plants.

The use of a rigid carrier layer facilitates the manufacturing process by allowing the flexible product layer to be conveyed through the processing apparatus in the same way as rigid devices.

UV excimer layers are generally used for interacting with the polyimide layer. However, these types of laser are expensive to purchase and to operate.

Where the laser is applied to the polyimide layer through the carrier layer, impurities or defects on or in the surface of the carrier layer can prevent the polyimide from being properly irradiated in localised regions that are shadowed by the impurity or defect. This can lead to incomplete release of the product layer from the carrier layer, potentially causing damage to the product layer and reduced product yield during the manufacturing process.

It is an object of the invention to provide methods and apparatus for scanning a laser beam over a substrate that address at least one of the problems with the prior art mentioned above. In particular, it is an object of the invention to allow laser release processing to be performed more cheaply, more reliably and/or more efficiently.

According to an aspect of the invention, there is provided a laser scanning system for scanning a laser beam over the surface of a substrate, comprising: a laser source for producing a laser beam; a substrate table for supporting the substrate; a scanning module containing programmable optics for selectively redirecting the laser beam; a control module for controlling the scanning module to scan the laser beam over the surface of the substrate; and a redirecting unit at a position in a beam path of the laser beam between the scanning module and the substrate, the redirecting unit being configured to control the direction of incidence of the laser beam onto the substrate, wherein: the control module and redirecting unit are configured to scan the laser beam over a predetermined region on the substrate in such a way that each portion of the region is exposed by the laser beam from a plurality of different directions of incidence.

Thus, an arrangement is provided in which a given region of the substrate can be irradiated from at least two different directions without requiring multiple laser systems and/or significant movement of components of the laser scanning system.

In an embodiment, the scanning module is used selectively to direct the laser beam to one of two different redirecting elements in order to achieve the different directions of incidence. The scanning module is in any event configured to redirect a laser beam because this is required to perform the operation of scanning the laser beam. Minimal or no adaptation of the scanning module is therefore required to implement this embodiment. In other embodiments, the output from the scanning module may be identical for each of the different directions of incidence, with all of the control for changing the direction of incidence being performed downstream of the scanning module. For example, the redirecting unit may comprise elements that are movable (e.g. two redirecting elements having different orientations from each other may be configured to be movable selectively into the beam path or a single redirecting element may be configured to be movable so as itself to take up different orientations).

As a result of the invention, the substrate (and/or interfaces within the substrate, for example a laser release layer positioned beneath a carrier layer, where this is provided) can be irradiated efficiently and reliably, even in the presence of impurities or defects on or in the substrate. Furthermore, this functionality is achieved without significantly increasing the overall mechanical complexity of the laser scanning system, thus improving reliability and minimising cost.

In an embodiment, the laser source comprises a diode-pumped solid state (DPSS) laser module, preferably operating in the UV band. Preferably, the DPSS laser module is a multi-mode DPSS laser module. Such laser sources are significantly (e.g. less than 50%) lower cost to purchase and operate than UV excimer lasers of equivalent power, which are used in many prior art arrangements to irradiate a laser release layers.

Preferably, the cross-section of the laser beam is homogenised to create a uniform radiation dosage across the substrate.

Preferably, the polarization of the beam is controlled to minimize reflection at the interface between the carrier and air and maximise the energy reaching the release layer in the substrate.

In an embodiment, the redirecting elements are arranged so that the components of the directions of propagation of laser beams reflected from the redirecting elements that are parallel to the plane of the substrate are at an angle other than 180 degrees relative to each other. This configuration increases the effectiveness of the laser scanning system in the event that impurities or defects having an elongate form are present on or in the substrate.

According to an aspect of the invention, there is provided a method of scanning a laser beam over the surface of a substrate, comprising: using a laser source to produce a laser beam; using a scanning module to scan the laser beam over the surface of a substrate; and using a redirecting unit at a position in a beam path of the laser beam between the scanning module and the substrate to control the direction of incidence of the laser beam onto the substrate, wherein: the laser beam is scanned over a predetermined region on the substrate in such a way that each portion of the region is exposed by the laser beam from a plurality of different directions of incidence.

Embodiments of the invention will now be described, by way of example only, with reference to the accompanying drawings in which corresponding reference symbols indicate corresponding parts, and in which.

Figure 1:
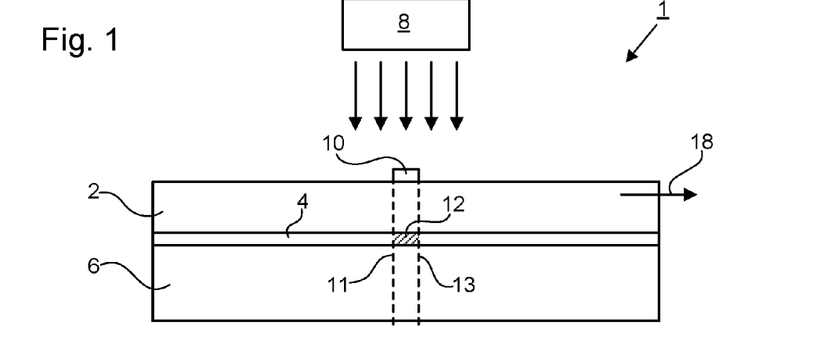
FIG. 1 depicts schematically how an impurity on the surface of a carrier layer can cause shadowing of a region of a laser release layer.

FIG. 1 depicts a laser system 8 that is configured to irradiate a substrate 1 for the purpose of releasing a product layer 6 from a carrier layer 2 by irradiating a laser release layer 4 sandwiched in between. As mentioned above, the laser release layer 4 may comprise polyimide, for example. The product layer 6 may comprise a flexible electrophoretic display or OLED display, for example. The carrier layer 2 may comprise rigid glass. The laser system 8 may be configured to output radiation having a wavelength in the UV band. Typically, the laser system 8, according to the prior art, would be implemented using a UV excimer laser. The substrate 1 may be scanned linearly underneath the laser system 8 (arrow 18).

An impurity or defect 10 on the surface of the carrier layer 2 may lead to shadowing of a region 12 of the laser release layer 4. In the arrangement shown, the region of shadow is defined by the portion of the laser release layer 4 that lies in between the broken lines 11 and 13. Such shadowing may cause incorrect release of the carrier layer 2 from the product layer 6.

Figure 2:
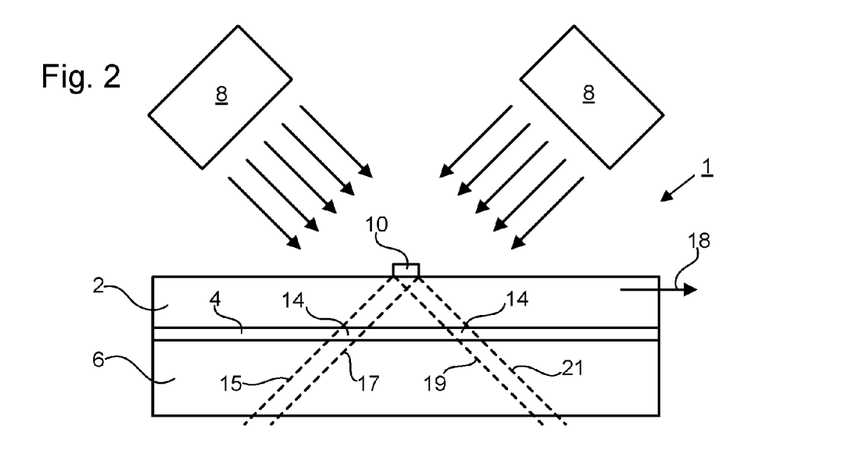
FIG. 2 depicts an arrangement in which laser radiation is applied from different oblique directions to reduce shadowing effects.

FIG. 2 depicts an arrangement in which the laser system 8 is configured to direct radiation onto the substrate 1 at an oblique angle from two different directions. In the arrangement shown, two different laser systems 8 are provided. This requires additional apparatus and therefore tends to increase expense, although throughput may be improved. In other arrangements, a single laser system 8 is used but is movable so that it can be positioned at each of the two orientations shown in FIG. 2 at different times. In the arrangement shown, it can be seen that the region of shadow for the right-hand laser system 8 is between the broken lines 15 and 17 and the region of shadow for the left-hand laser system 8 is between the broken lines 19 and 21. The different orientations of the two laser systems 8 means that the regions 14 of the laser release layer 4 that are in shadow are different for the two laser systems 8. Thus, while one of the regions 14 is in shadow for one of the laser systems 8 it is nevertheless exposed by the other laser system 8. In this way, all of the laser release layer 4 can be exposed by at least one of the two laser systems 8. However, this success relies on the impurity or defect 10 being relatively point-like.

In the arrangement shown in FIG. 2, the laser systems 8 are arranged at 180 degrees relative to each other. That is, when viewed along a direction perpendicular to the surface of the substrate 1 the directions of propagation of radiation from the two laser systems 8 are antiparallel to each other. This arrangement is effective for point-like impurities or defects 10. However, the inventors have realised that such an arrangement is not effective for other types of impurity or defect. In particular, the approach is not effective where the impurity or defect extends significantly in a direction parallel to the components of the directions of propagation of the radiation from the two laser sources 8 that are parallel to the surface of the substrate 1.

Figure 3:
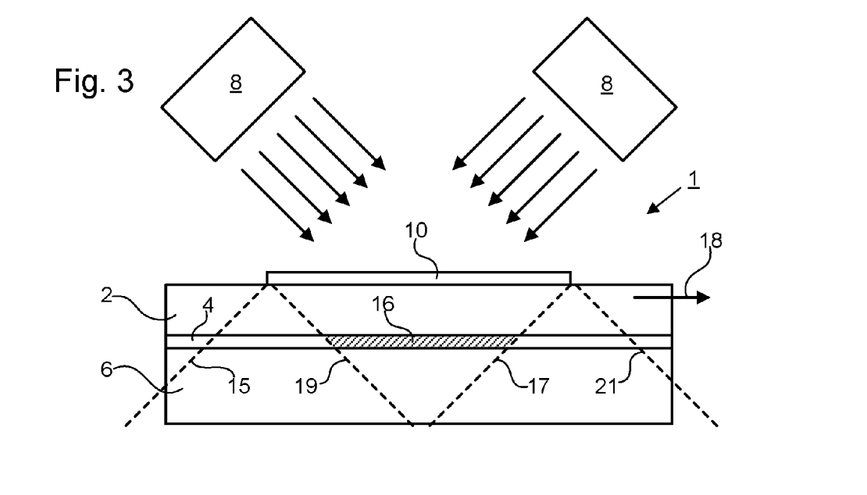
FIG. 3 illustrates a situation in which an elongate impurity on the surface of the carrier layer causes shadowing of the laser release layer even when laser radiation is applied from different oblique directions.

FIG. 3 illustrates how impurities or defects 10 that extend in this way can cause shadowing of regions of the laser release layer 4 even when laser radiation is applied to the substrate from different oblique directions as in the arrangement of FIG. 2. In the example shown, the impurity or defect 10 has an elongate form that extends in a direction parallel to the components of the directions of propagation of the radiation from the laser systems 8 that are parallel to the plane of the substrate 1. A scratch, crack or human hair on or in the surface of the carrier layer 2 may form or cause such an impurity or defect, for example. As can be seen, the region of shadowing from the right-hand laser system 8 is between the broken line 15 and 17 and the region of shadowing from the left-hand laser system 8 is between the broken lines 19 and 21. The region 16 of the laser release layer 4 cannot be exposed by either of the two laser systems 8 and is therefore completely shadowed during the irradiation process. In this situation, the product layer 6 may not release properly from the carrier layer 2 at the end of the processing, leading to damage or reduced throughput.

Figure 4:
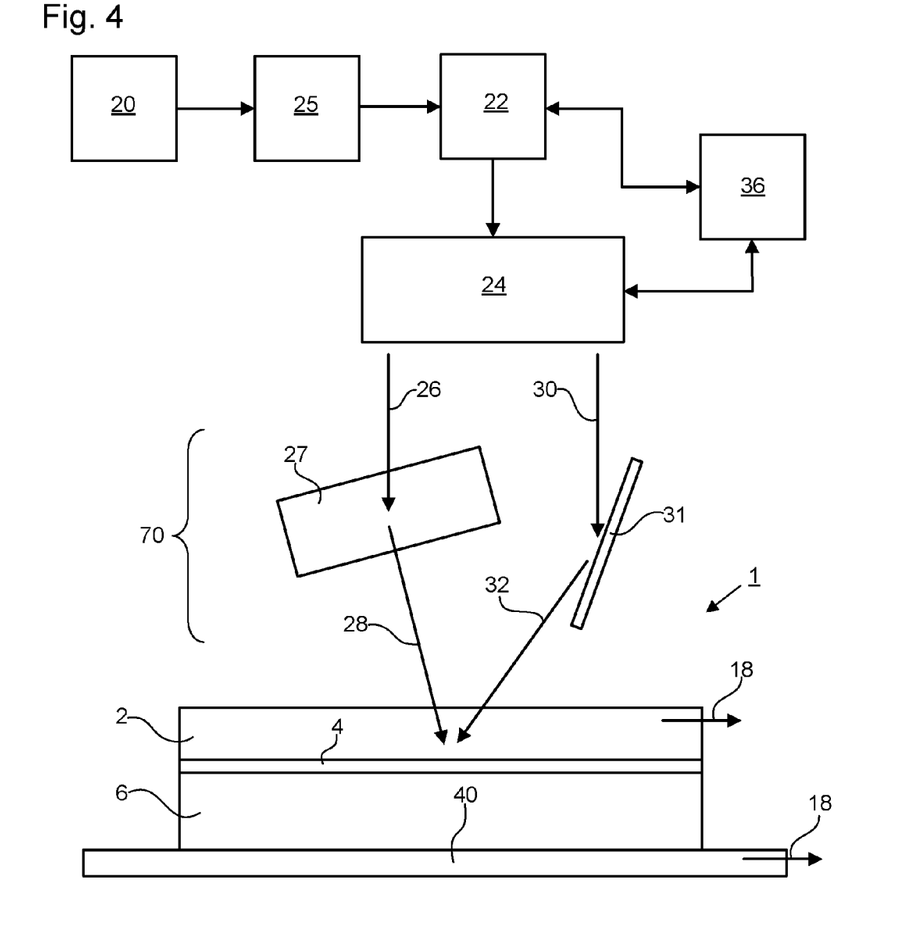
FIG. 4 depicts a laser scanning system in which the laser beam is applied to the substrate selectively via two differently oriented redirecting (reflective) elements.

FIG. 4 illustrates an embodiment of the invention, which addresses some of the problems discussed above.

According to this embodiment, a laser scanning system is provided for scanning a laser beam over the surface of a substrate 1. The laser scanning system may be configured to scan the laser beam in a raster pattern for example. In an embodiment, the laser scanning system is configured to scan the laser beam linearly, for example in a reciprocal manner, while the substrate 1 is scanned underneath, for example in a direction perpendicular to the reciprocal scanning of the laser beam.

The laser scanning system comprises a laser source 20 for producing a laser beam. Preferably, the laser source comprises a diode-pumped solid state laser (DPSS) module. DPSS lasers are significantly less expensive than excimer lasers. Preferably, the DPSS laser module is configured to operate in the UV band, for example at 355 nm. In an embodiment, the laser is configured to be suitable for irradiation of a polyimide layer for the purposes of causing laser interaction and vapourization of the polyimide layer followed by release of the product layer from the carrier layer.

UV excimer lasers are typically used for laser release because they can irradiate large areas of a substrate simultaneously and uniformly with high intensity. However, the inventors have realised that the much cheaper DPSS lasers can also be used effectively to implement laser release by rapidly raster scanning the laser beam over the surface of the substrate. Although the instantaneous region of the substrate that can be irradiated with a DPSS is much smaller than for an excimer laser, the pulse rate of a DPSS laser is sufficiently quick that a comparable radiation dosage can be applied by scanning the DPSS laser beam over the substrate at high speed.

The output from a DPSS laser is generally a laser beam having a cross-sectional intensity profile that is highly inhomogeneous and not therefore suitable for optimal irradiation of a laser release layer where uniform irradiation is important. However, the inventors have realised that this challenge can be overcome by including a beam homogeniser 25 in the laser scanning system which acts to homogenise the intensity profile of the laser beam output from the laser source 20. The output from the beam homogenizer may be made to resemble a "top-hat" function, for example. In an embodiment, the beam homogeniser 25 is implemented using a diffractive optical element (DOE).

In an embodiment, a substrate table 40 is provided for supporting the substrate 1. The substrate table 40 may be configured to move the substrate 1 relative to the laser source 20, either one dimensionally or two dimensionally. Examples of how the substrate 1 may be moved relative to the laser source 20 are described in further detail below with reference to FIGS. 6-8.

In an embodiment, the laser scanning system comprises a scanning module 24 for selectively redirecting the laser beam in order to perform the raster scanning of the laser beam. In an embodiment, the scanning module 24 comprises programmable optics. In an embodiment, the laser scanning system further comprises a control module 36 for controlling the scanning module 24 to scan the laser beam over the surface of the substrate 1. The control module 36 may control the programmable optics of the scanning module 24, for example, in order to achieve the required scanning of the laser beam.

In an embodiment, the laser scanning system further comprises a redirecting unit 70 at a position in a beam path of the laser beam between the scanning module 24 and the substrate 1. The redirecting unit 70 is configured to control the direction of incidence of the laser beam onto the substrate 1. In an embodiment, the control module 36 and redirecting unit 70 are configured to scan the laser beam over a predetermined region on the substrate 1 in such a way that each portion of the region is exposed by the laser beam from a plurality of (for example two) different directions of incidence.

In an embodiment, the redirecting unit 70 is configured to change the direction of propagation of the laser beam using one or more of the following mechanisms: reflection, refraction (e.g. using a prism), diffraction (e.g. using a diffractive optical element).

In an embodiment, the redirecting unit 70 comprises a first redirecting element 27 and a second redirecting element 31. Both redirecting elements 27, 31 are positioned in the beam path between the scanning module 24 and the substrate 1. The redirecting elements 27, 31 have different orientations relative to each other. The control module 36 is configured to scan the laser beam over a region on the substrate 1 via redirection (e.g. reflection) from the first redirecting element 27 (thereby achieving an oblique angle of incidence relative to the substrate surface) and, subsequently, to scan the laser beam over the same region on the substrate via redirection (e.g. reflection) from the second redirecting element 31 (thereby achieving an oblique angle of incidence relative to the substrate surface, but from a different direction in comparison with the radiation from the first redirecting element 27). Switching between the two redirecting elements can be achieved by changing the direction of beams output from the scanning module 24 (e.g. selectively to direct the radiation exclusively to one or the other of the two redirecting elements), moving one or both of the redirecting elements (e.g. selectively to move one or the other of the redirecting elements into the beam path), or both.

In the particular example shown in FIG. 4, output beam 26 illustrates the case where the beam is directed to the first redirecting element 27 from the scanning module 24. Redirection (e.g. reflection) from the first redirecting element 27 is illustrated by beam 28. Similarly, output beam 30 illustrates the case where the beam is directed to the second redirecting element 31 from the scanning module 24. The redirection (e.g. reflection) from the second redirecting element 31 is illustrated by beam 32.

In an alternative embodiment, the redirecting unit 70 may comprise a redirecting element that is moveable between a first position and a second position, the redirecting element being oriented differently in the first position than in the second position. For example, the redirecting element in this case may be mounted so as to be rotatable relative to a normal to the surface of the substrate 1. Thus, a single redirecting element may provide equivalent functionality to the first and second redirecting elements 27,31 discussed above. The control module 36 may in this case be configured to scan the laser beam over a region of the substrate 1 via the redirecting element when it is in the first position, in order to expose each portion of the region from a first direction of incidence, and to scan the laser beam over the same region of the substrate via the redirecting element when it is in the second position, in order to expose each portion of the region from a second direction of incidence, different from the first direction of incidence. The need to provide means for accurately moving the redirecting element increases system complexity but the overall arrangement may be more compact, particularly in the region of the beam path between the scanning module 24 and the substrate 1.

Thus, laser scanning systems are provided that can irradiate the same region of the substrate 1 from different directions. As described above with reference to FIG. 2, this allows the substrate or interfaces supported by the substrate 1 to be irradiated reliably even in the presence of impurities or defects on or in the substrate 1. According to this embodiment, this functionality is achieved without having to provide multiple laser systems and without having to reorient any significant components of the laser scanning system. All that is required for the laser scanning system to apply the radiation from the different directions is a minor reprogramming of the control module 36, for example to cause the scanning module 24 to redirect its output to one or the other of the two redirecting elements 27, 31 (e.g. where the two redirecting elements 27,31 are held entirely stationary relative to the scanning module) and/or to take account of the fact that such redirection has occurred (e.g. where the redirection is partially or completely implemented by moving one or both of the redirecting elements 27, 31).

In an embodiment, the redirecting unit 70 is configured such that the different directions of incidence are not at 180 degrees relative to each other (preferably are between 10 and 170 degrees, preferably between 30 and 150 degrees, preferably between 60 and 120 degrees, preferably at substantially 90 degrees) when viewed along the normal to the substrate. For example, in the case where the redirecting unit 70 comprises redirecting elements 27, 31 having planar reflective surfaces, a component of the normal to the reflective surface of the first redirecting element 27 that is parallel to the surface of the substrate table 40 is at an angle other than 180 degrees to a component of the normal to the reflective surface of the second redirecting element 31 that is parallel to the surface of the substrate table 40. As a result, none of the directions of incidence of the laser beam onto the substrate 1 via the first redirecting element 27 has a component parallel to the substrate surface that is parallel or antiparallel to a component parallel to the substrate surface of any of the directions of incidence of the laser beam onto the substrate via the second redirecting element 31. In this way, even if the impurity or defect 10 has an elongate form of the type illustrated and discussed above with reference to FIG. 3, the possibility of shadowing a region of the substrate or of an interface within the substrate is reduced or avoided.

Figure 5:
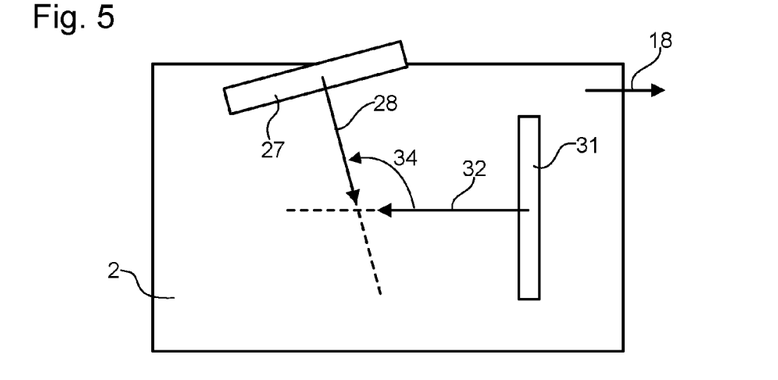
FIG. 5 is a view along a direction perpendicular to a substrate of an arrangement of the type illustrated in FIG. 4 showing the relative orientations of the two redirecting elements.

FIG. 5 is a view along an axis perpendicular to the surface of the carrier layer 2 illustrating an example configuration of this type. Here, the components of the normal to the reflective surfaces of the redirecting elements 27, 31 that are parallel to the surface of the substrate table 40 are illustrated by arrows 28 and 32 respectively. As can be seen, the angle 34 between these components is an angle other than 180 degrees. In this example, the angle 34 is about 100 degrees.

In an embodiment, the laser scanning system comprises a programmable polarizer for selectively changing the polarization of the laser beam that is to be scanned over the substrate 1. The control module 36 in such an embodiment may be configured to cause the polarizer 22 to change the polarization of the laser beam as a function of the direction of incidence of the laser beam onto the substrate. In the case where the redirecting unit 70 comprises first and second redirecting elements 27,31, the control module 36 may be configured to cause the polarizer 22 to change the polarization of the laser beam as function of whether the laser beam is to be directed onto the substrate 1 via the first redirecting element 27 or via the second redirecting element 31.

Changing the polarization of the laser beam in this way makes it possible to optimise the polarization according to the expected direction of incidence onto the substrate 1 in order to minimise reflection from the air to carrier interface or from any interface supported by the substrate that is above the layer of interest. Thus, absorption of the laser radiation by the layer of interest can be maximised. In the embodiment shown in FIG. 4 for example, the polarization may be adjusted to minimize reflection from the interface between the carrier layer 2 and the air above the carrier layer 2 so that a maximum amount of radiation penetrates through the carrier layer 2 to the laser release layer 4.

This approach is particularly effective when the laser source comprises a DPSS laser module, where the output is generally polarized and changing of the polarization can be achieved efficiently and with minimal reduction in laser intensity. Excimer lasers are un-polarized and hence reflection of radiation from the substrate at oblique angles is significant (e.g. up to 20%).

In an embodiment, the control module 36 is configured to cause the polarizer 22 to change the polarization of the laser beam such that, in a case where the control module 36 is configured to direct the laser beam onto a portion of a region from a first direction of incidence and a second direction of incidence, when the laser beam is directed onto the portion from the first direction of incidence, reflection of the laser beam from an interface supported by the substrate is less than it would have been if the laser beam were directed onto the portion from the second direction of incidence with the same polarization. Similarly, the control module 36 may additionally or alternatively be configured to cause the polarizer 22 to change the polarization of the laser beam such that when the laser beam is directed onto the portion from the second direction of incidence, reflection of the laser beam from an interface supported by the substrate is less than it would have been if the laser beam were directed onto the portion from the first direction of incidence with the same polarization.

For example, in an embodiment in which the redirecting unit 70 comprises a first redirecting element 27 and a second redirecting element 31, the control module 36 is configured to cause the polarizer 22 to change the polarization of the laser beam such that, when the laser beam is directed via the first redirecting element 27, reflection of the laser beam from an interface supported by the substrate 1 (e.g. the interface between the carrier layer 2 and the environment above the carrier layer 2) is less than it would have been if the laser beam were directed via the second redirecting element 31 with the same polarisation. Similarly, in such an embodiment, the control module 36 may additionally or alternatively be configured to cause the polarizer 22 to change the polarization of the laser beam such that, when the laser beam is directed via the second redirecting element 31, reflection of the laser beam from an interface supported by substrate 1 is less than it would have been if the laser beam were directed via the first redirecting element 27 with the same polarisation.

In an embodiment, the control module is configured to cause the polarizer 22 to polarize the laser beam in such a way that the electric field component of the laser beam when it is incident on the substrate 1 will be substantially coplanar with the direction of propagation of the laser beam and the normal to the surface of the substrate 1 (so called p-polarization)

In an embodiment, the laser beam is directed onto an interface supported by the substrate (e.g. the interface between the carrier layer 2 and the environment above the carrier layer 2) at an angle that is within 25 degrees of the Brewster angle of the interface, preferably within 10 degrees of the Brewster angle, preferably within 1 degree of the Brewster angle. At the Brewster angle the reflection of p-polarized radiation falls to zero.

In an embodiment, the substrate 1 is moved, for example linearly, relative to the laser source during scanning of the laser beam over the substrate. This may be achieved in a variety of different ways.

Figure 6:
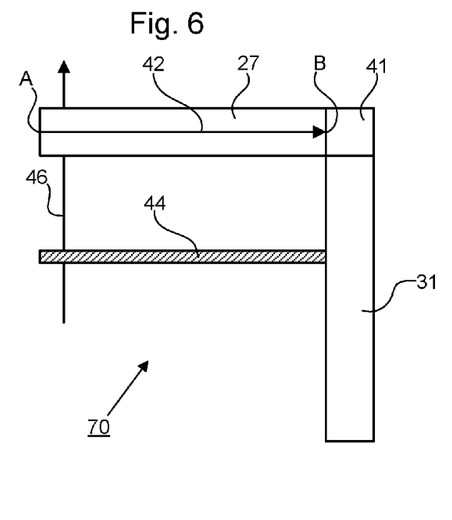
FIG. 6 depicts movement of a first redirecting element relative to the substrate in a first scanning direction in order to expose portions on the substrate from a first direction of incidence.
Figure 7:
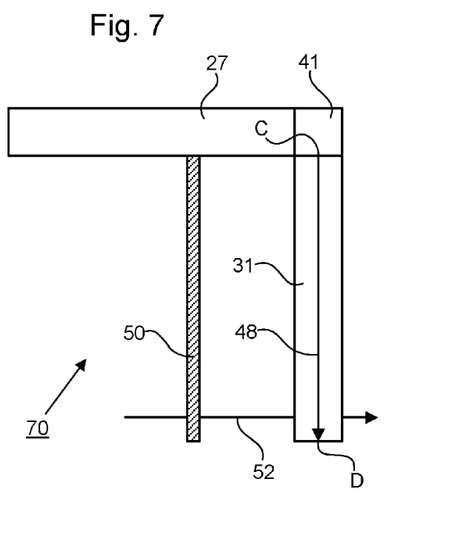
FIG. 7 depicts movement of a second redirecting element relative to the substrate in a second scanning direction in order to expose portions on the substrate from a second direction of incidence.

FIGS. 6 and 7 depict an example redirecting unit 70 viewed along the normal to the substrate surface and illustrate an example approach in which a region on the substrate 1 is exposed during two separate time periods. In the embodiment shown, the redirecting unit 70 comprises first and second redirecting elements 27,31 arranged at right angles to each other (although other angles could be used) and connected together rigidly by connector 41 (optional).

FIG. 6 illustrates movement 46 of the substrate 1 during one of the time periods. In this embodiment, the substrate movement is perpendicular to a first redirecting element 27. The control module 36 is configured to scan the laser beam in a reciprocal manner over the first redirecting element 27. In this embodiment, the direction of the reciprocal scanning 42 is also perpendicular to the movement direction 46. The rate of the reciprocal scanning and the substrate movement speed are coordinated so as to expose a region on the substrate 1 in a desired manner. In the schematic drawing shown, region 44 represents a region that would be exposed by scanning the laser beam along the path 42 on the first reflective element 27 (e.g. from A to B). It can be seen that by suitable movement of the substrate 1 and repeated scanning of the laser beam over the first reflective element 27, a wider rectangular region, extending along the movement direction 46, can be exposed.

FIG. 7 illustrates movement 52 of the substrate 1 during a subsequent time period. The substrate movement 52 in this case is perpendicular to the second reflective element 31. The control module 36 is configured to scan the laser beam in a reciprocal manner over the second reflective element 31. In this embodiment, the direction of the reciprocal scanning 48 is also perpendicular to the movement direction 52. In this case, region 50 represents a region that would be exposed by scanning the laser beam along the path 48 on the second reflective element 31 (e.g. from C to D). By suitable movement of the substrate and repeated scanning of the laser beam over the second reflective element 27, a wider rectangular region, extending along the movement direction 52, can be exposed that overlaps with, or is the same as, the region exposed during the preceding time period (illustrated in FIG. 6).

Thus, a region is exposed during a first time period via reflection from the first reflective element 27 and, during a second time period, via reflection from the second reflective element 31. Each portion of the exposed region is therefore exposed twice and from two different directions.

The approach of FIGS. 6 and 7 is efficient because substantially all of the laser beam energy that is applied to the surface of the substrate can be used as part of an exposure from different directions. In other words, it is possible to make the regions exposed during each of the two time periods overlap perfectly with each other (although this is not essential).

Figure 8:
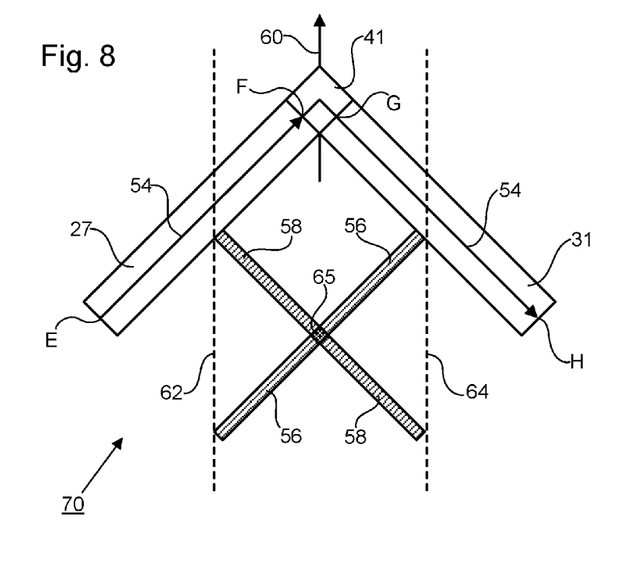
FIG. 8 depicts an arrangement in which portions on the substrate are exposed from different directions during movement of the substrate in a single direction relative to first and second redirecting elements.

FIG. 8 depicts an alternative example redirecting unit 70 viewed along the normal to the substrate surface and illustrates an alternative example approach in which a region on the substrate 1 is exposed from different directions while moving the substrate in a single movement direction. In the embodiment shown, the redirecting unit 70 comprises first and second redirecting elements 27,31 arranged at right angles to each other and connected together rigidly by connector 41.

In this embodiment, the first and second redirecting elements 27,31 are provided at the same angle (45 degrees in the example shown) relative to a movement direction 60 of the substrate 1. In other embodiments the redirecting elements 27,31 may be provided at different angles relative to each other. Region 56 represents a region that would be exposed by scanning the laser beam along a path 54 on the first reflective element 27 (e.g. E to F). Region 58 represents a region that would be exposed by scanning the laser beam along a path 54 on the second reflective element 31 (e.g. G to H). Thus, scanning of the laser beam from E to H (over both the reflective elements 27,31 produces a cross shape on the substrate, with a central section 65 receiving incident radiation from two different directions during the scan. Movement of the substrate 60 scans the cross in a vertical direction and allows exposure of a region on the substrate in between the broken lines 62 and 64. In an embodiment, the substrate movement is coordinated with a reciprocal scanning of the laser beam of the two redirecting elements 27,31 (e.g. reciprocally from E to H and back again). It can be seen that the exposed region within the broken lines will comprise regions that have been exposed by both of the redirecting elements 27,31. Exceptions are the triangular regions at the extreme ends of the substrate movement path. In comparison with the arrangement of FIGS. 6 and 7, the total required length of movement of the substrate 1 in a given direction may be slightly longer in order take account of these triangular regions. However, there is no need for the substrate to be moved again, in a different direction, in a subsequent exposure sequence. The overall substrate movement operation required for exposing the region on the substrate to radiation from different directions is therefore simplified.

The invention claimed is:

1. A laser scanning system for scanning a laser beam over the surface of a substrate, comprising:
    a laser source for producing a laser beam;
    a substrate table for supporting the substrate;
    a scanning module containing programmable optics for selectively redirecting the laser beam;
    a control module for controlling the scanning module to scan the laser beam over the surface of the substrate; and
    a redirecting unit at a position in a beam path of the laser beam between the scanning module and the substrate, the redirecting unit being configured to control the direction of incidence of the laser beam onto the substrate, wherein:
    the control module and redirecting unit are configured to scan the laser beam over a predetermined region on the substrate in such a way that each portion of the region is exposed by the laser beam from a plurality of different directions of incidence.

2. A system according to claim 1, wherein:
    the redirecting unit comprises a first redirecting element and a second redirecting element, the first redirecting element being oriented differently to the second redirecting element; and
    the control module is configured to scan the laser beam over the region of the substrate via the first redirecting element, in order to expose each portion of the region from a first direction of incidence, and to scan the laser beam over the region of the substrate via the second redirecting element, in order to expose each portion of the region from a second direction of incidence, different from the first direction of incidence.

3. A laser scanning system according to claim 2, wherein one or each of the redirecting elements is configured to change the direction of propagation of the laser beam by reflection, by refraction, or by diffraction.

4. A system according to claim 1, wherein the first and second redirecting elements have planar reflective surfaces.

5. A system according to claim 4, wherein a component of the normal to the reflective surface of the first redirecting element that is parallel to the surface of the substrate table is at an angle other than 180 degrees to a component of the normal to the reflective surface of the second redirecting element that is parallel to the surface of the substrate table.

6. A system according to claim 1, wherein:
    the redirecting unit comprises a redirecting element that is moveable between a first position and a second position, the redirecting element being oriented differently in the first position than in the second position; and
    the control module is configured to scan the laser beam over the region of the substrate via the redirecting element in the first position, in order to expose each portion of the region from a first direction of incidence, and to scan the laser beam over the region of the substrate via the redirecting element in the second position, in order to expose each portion of the region from a second direction of incidence, different from the first direction of incidence.

7. A laser scanning system according to claim 1, wherein:
    the substrate table is configured to move the substrate during scanning of the laser beam; and the control module is configured to expose each portion of the region from a first direction of incidence while the substrate is being moved in a first movement direction and, at a subsequent time, expose each portion of the region from a second direction of incidence, different from the first direction of incidence, while the substrate is being moved in a second movement direction, different from the first movement direction.

8. A laser scanning system according to claim 1, wherein: the substrate table is configured to move the substrate during scanning of the laser beam; and
the control module is configured to expose each portion of the region from a plurality of different directions in a time period during which the substrate being moved in a single movement direction only.

9. A laser scanning system according to claim 8, wherein the control module is configured to scan the laser beam linearly relative to the laser source in two different directions that are each oblique to the single movement direction while the substrate is being moved in the single scanning direction.

10. A system according to claim 1, wherein the laser source comprises a diode-pumped solid state laser module.

11. A system according to claim 1, wherein the wavelength of the laser beam is in the UV band.

12. A system according to claim 1, further comprising:
a programmable polarizer for selectively changing the polarization of the laser beam, wherein:
the control module is configured to cause the polarizer to change the polarization of the laser beam as a function of the direction of incidence of the laser beam onto the substrate.

13. A system according to claim 12, wherein the control module is configured to cause the polarizer to change the polarization of the laser beam such that, in a case where the control module is configured to direct the laser beam onto a portion of the region from a first direction of incidence and a second direction of incidence, when the laser beam is directed onto the portion from the first direction of incidence, reflection of the laser beam from an interface supported by the substrate is less than it would have been if the laser beam were directed onto the portion from the second direction of incidence with the same polarization.

14. A system according to claim 12, wherein the control module is configured to cause the polarizer to change the polarization of the laser beam such that, in a case where the control module is configured to direct the laser beam onto a portion of the region from a first direction of incidence and a second direction of incidence, when the laser beam is directed onto the portion from the second direction of incidence, reflection of the laser beam from an interface supported by the substrate is less than it would have been if the laser beam were directed onto the portion from the first direction of incidence with the same polarization.

15. A system according to claim 12, wherein the control module is configured to cause the polarizer to polarize the laser beam in such a way that the electric field component of the laser beam when it is incident on the substrate will be substantially coplanar with the direction of propagation of the laser beam and the normal to the surface of the substrate.

16. A system according to claim 1 further comprising a beam homogenizer for homogenizing the cross-sectional intensity profile of the laser beam.

17. A system according to claim 1, wherein the redirecting unit is configured such that none of the directions of incidence of the laser beam onto the substrate has a component parallel to the substrate surface that is parallel or antiparallel to a component parallel to the substrate surface of any other of the directions of incidence of the laser beam onto the substrate.

18. A method of scanning a laser beam over the surface of a substrate, comprising:
using a laser source to produce a laser beam;
using a scanning module to scan the laser beam over the surface of a substrate; and
using a redirecting unit at a position in a beam path of the laser beam between the scanning module and the substrate to control the direction of incidence of the laser beam onto the substrate, wherein:
the laser beam is scanned over a predetermined region on the substrate in such a way that each portion of the region is exposed by the laser beam from a plurality of different directions of incidence.

19. A method according to claim 18, wherein:
the redirecting unit comprises a first redirecting element and a second redirecting element, the first redirecting element being oriented differently to the second redirecting element; and
the laser beam is scanned over the region of the substrate via the first redirecting element, in order to expose each portion of the region from a first direction of incidence, and scanned over the region of the substrate via the second redirecting element, in order to expose each portion of the region from a second direction of incidence, different from the first direction of incidence.

20. A method according to claim 18, wherein the laser source comprises a diode-pumped solid state laser module.

21. A method according to claim 18, wherein the wavelength of the laser beam is in the UV band.

22. A method according to claim 18, wherein the substrate comprises a carrier layer attached to a product layer via a laser release layer, and the laser beam is configured such that irradiation of the material of the laser release layer by the laser beam is effective to cause release of the product layer from the carrier layer in the region of the irradiation.

23. A method according to claim 18, wherein the polarization of the laser beam is controlled as a function of the direction of incidence of the laser beam onto the substrate.

24. A method according to claim 23, wherein:
the redirecting unit comprises a first redirecting element and a second redirecting element, the first redirecting element being oriented differently to the second redirecting element; and
the polarization of the laser beam is controlled as a function of whether the laser beam is to be directed via the first redirecting element or the second redirecting element.

25. A method according to claim 18, wherein the polarization of the laser beam is controlled such that the electric field component of the laser beam incident on the substrate is substantially coplanar with the direction of propagation of the laser beam and a normal to the surface of the substrate.

26. A method according to claim 18, wherein the laser beam is directed onto the substrate or onto an interface supported by the substrate at an angle that is within 25 degrees of the Brewster angle at the surface of the substrate or at the interface supported by the substrate.

27. A method according to claim 18, wherein the plurality of different directions of incidence are at angles relative to each other, when viewed along a normal to the substrate surface, other than 0 degrees and 180 degrees.

28. A method according to claim 18, wherein the cross-sectional intensity profile of the laser beam is homogenized before the laser beam reaches the substrate.

\* \* \* \* \*